United States Patent
Kwon et al.

(10) Patent No.: US 7,738,419 B2
(45) Date of Patent: Jun. 15, 2010

(54) APPARATUS AND METHOD FOR CONTROLLING REVERSE RATE IN MOBILE COMMUNICATION SYSTEM

(75) Inventors: Hwan-Joon Kwon, Gyeonggi-do (KR); Jung-Soo Jung, Seoul (KR); Beom-Sik Bae, Suwon-si (KR); Dae-Gyun Kim, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 1569 days.

(21) Appl. No.: 11/025,824

(22) Filed: Dec. 27, 2004

(65) Prior Publication Data

US 2005/0143083 A1 Jun. 30, 2005

(30) Foreign Application Priority Data

Dec. 26, 2003 (KR) .................. 10-2003-0097984

(51) Int. Cl.
*H04W 4/00* (2009.01)
*H04W 72/00* (2009.01)
*H04J 1/16* (2006.01)
*H04J 3/14* (2006.01)
*H04J 1/00* (2006.01)

(52) U.S. Cl. .................. 370/329; 370/235; 455/450; 455/452.1

(58) Field of Classification Search .................. 370/328, 370/329, 229, 235; 455/450, 451, 452.1, 455/452.2

See application file for complete search history.

(56) References Cited

U.S. PATENT DOCUMENTS

| | | |
|---|---|---|
| 7,184,447 B1 | 2/2007 | Koo et al. |
| 2002/0136286 A1 | 9/2002 | Koo |
| 2002/0172217 A1 | 11/2002 | Kadaba et al. |
| 2003/0036267 A1 | 2/2003 | Hirabayashi et al. |
| 2003/0039267 A1 | 2/2003 | Koo et al. |
| 2003/0073443 A1 | 4/2003 | Bae et al. |

(Continued)

FOREIGN PATENT DOCUMENTS

EP 1 248 417 10/2002

(Continued)

OTHER PUBLICATIONS

Young-uk Chung et al., "An Efficient Reverse Link Data Rate Control Scheme for 1xEV-DV System", Vehicular Technology Conference, Oct. 7-11, 2001.

(Continued)

*Primary Examiner*—Un C Cho
(74) *Attorney, Agent, or Firm*—The Farrell Law Firm, LLP (57) ABSTRACT

Disclosed are an apparatus and a method for controlling a reverse rate of data transmitted to a BTS (base transceiver station) from MSs (mobile stations), to which an autonomous rate control is granted. The method includes the steps of checking whether a limitation for a reverse autonomous rate of an MS is persistent when it is determined from a reverse load that the limitation for the reverse autonomous rate of the MS is necessary, and transmitting information for limiting the reverse autonomous rate of the MS and information indicating persistence of the limitation for the reverse autonomous rate to the MS when it is necessary to persistently maintain the limitation for the reverse autonomous rate of the MS.

19 Claims, 7 Drawing Sheets

U.S. PATENT DOCUMENTS

2005/0201280 A1* 9/2005 Lundby et al. .............. 370/229

FOREIGN PATENT DOCUMENTS

| KR | 2002-0076104 | 10/2002 |
|---|---|---|
| RU | 2 216 107 | 11/2003 |
| WO | WO 02/065664 | 8/2002 |
| WO | WO 2004/080006 | 9/2004 |

OTHER PUBLICATIONS

Mo-Han Fong et al., "Combined Rate Control and Scheduling for Reverses Link", 3GPP2 TSG-C, Nortel Networks, C30-20030818-054.

* cited by examiner

APPARATUS AND METHOD FOR CONTROLLING REVERSE RATE IN MOBILE COMMUNICATION SYSTEM

PRIORITY

This application claims priority to an application entitled "Apparatus And Method For Controlling Reverse Rate In Mobile Communication System" filed with the Korean Intellectual Property Office on Dec. 26, 2003 and assigned Serial No. 2003-97984 the contents of which are incorporated herein by reference.

BACKGROUND OF THE INVENTION

1. Field of the Invention

The present invention relates to an apparatus and a method for controlling a reverse rate in a mobile communication system, and more particularly to an apparatus and a method for limiting a rate of a mobile station to which an autonomous rate control is granted.

2. Description of the Related Art

In a conventional mobile communication system, a reverse data transmission from a mobile station (MS) to a base transceiver station (BTS) can be achieved through packet data channels in a physical layer packet unit. A data rate of each physical layer packet may vary depending on packets and the BTS controls the data rate of each physical layer packet. That is, the BTS controls data rates of various MSs. Such a procedure of the BTS for determining and controlling data rates of the MSs is called a "scheduling". The BTS conducts the scheduling based on feedback information transmitted thereto from the MSs on the basis of information related to power of the MSs and quantity of data to be transmitted from the MSs. That is, a scheduler of the BTS conducts the scheduling by taking a load obtained from "rise of thermal (RoT)" or "signal to noise ratio (SNR)" of MSs located in a service area of the BTS into consideration.

The control scheme of the BTS for the reverse data rates of the MSs is mainly classified into a fast scheduling scheme and a rate control (RC) scheme.

An MS operating with the fast scheduling scheme transmits a rate request message including a present buffer state and information about usable power of the MS to the BTS. Upon receiving the rate request message from the MS, the BTS transmits rate grant information to the MS by taking thermal noise, QoS of the MS, and other relevant information into consideration so as to allow the MS to transmit data with a maximum rate.

In the fast scheduling mode, the MS can transmit the rate request message including a present buffer state and information about usable power of the MS to the BTS, and the BTS can allocate a specific rate to the MS through grant message information by taking a request of the MS and a load state of a cell into consideration.

The RC scheme of the BTS is classified into a DRC (dedicated rate control) scheme and a CRC (common rate control) scheme depending on transmission schemes of control information. The BTS controlling the MS using the DRC scheme may transmit dedicated rate control information to each MS located in the service area of the BTS, and the BTS controlling the MS using the CRC scheme may transmit common rate control information to each MS located in the service area of the BTS.

That is, the BTS capable of controlling the MS using the DRC scheme transmits dedicated control information to each MS located in a cell, so the BTS can finely control the rate MS as compared with the BTS using the CRC scheme wherein all MSs treated in the service area of the BTS are controlled in common. However, in the DRC scheme requires, a great amount of control information to be transmitted than using the CRC scheme.

A BTS capable of controlling an MS with the CRC scheme transmits control information notifying MSs located in a cell of a "Busy" state of the reverse transmission if the RoT measured by the BTS exceeds a predetermined limitation value, or transmits control information notifying the MSs of a "Not Busy" state of the reverse transmission if the RoT is lower than the predetermined limitation value. When the control information representing the "Busy" state is received in the MS from the BTS, the MS can reduce the RoT of the cell by lowering the data rate of the MS or a traffic-to-pilot ratio (TPR) which will be described later. In addition, when the control information representing the "Not Busy" state is received in the MS from the BTS, the MS can increase the data rate of the MS or the TPR. Such an information related to the "Busy" and "Not Busy" states can be transmitted to the MSs through a rate control bit (RCB) being one bit in size.

The DRC scheme of the BTS is classified into a full rate transition scheme and a limited rate transition scheme according to a transition degree of the reverse data rate of the MS.

According to the full rate transition scheme, the BTS controls the reverse data rate of the MS without limiting a transition range of the data rate. In contrast, according to the limited rate transition scheme, the BTS controls the reverse data rate of the MS while limiting the transition range of the data rate within one step.

For example, if a set of the data rates includes 9.6 kbps, 19.2 kbps, 38.4 kbps, 76.8 kbps, 153.6 kbps, and 307.2 kbps, the number and specific value of data rates included in the set of the data rates may vary depending on systems. According to the full rate transition scheme, one of the data rates included in the data rate set can be determined as the data rate of the next packet of the MS by means of the BTS. That is, according to the full rate transition scheme, the MS transmitting data with a data rate of 9.6 kbps can transmit the next packet with a data rate of 307.2 kbps at a time because the BTS allows the MS to transmit the data with a predetermined reverse rate regardless of a previous data rate of the MS.

In contrast, according to the limited rate transition scheme, the BTS may determine the data rate of the next packet of the MS while up-converting or down-converting the data rate from the previous data rate of the MS by one step. For instance, a MS transmitting data with the data rate of 76.8 kbps can transmit the next packet with the data rate of only 38.4 kbps, 76.8 kbps or 153.6 kbps. In other words, since the data rate of the MS is up-converted or down-converted from the data rate of 76.8 kbps by one step, the transition range for the data rate of the MS is limited. Commands used for up-converting, down-converting and holding the data rate of the MS can be represented as "UP", "DOWN" and "HOLD". In addition, a signal mapping into "+1", "−1" and "0" can be performed.

The full rate transition scheme and the limited rate transition scheme each have advantages and disadvantages.

The full rate transition scheme has an advantage in that the BTS can determine the data rate of the MS without limitations. However, the full rate transition scheme has a disadvantage in that it requires a great amount of bits in order to transmit the scheduling result to the MS. For instance, if six data rates exist as described above, 3 bits are necessary for representing all data rates. In addition, since it is necessary to transmit information about identifiers of the MSs, a great amount of information must be transmitted. In contrast, the full rate transition scheme has a disadvantage in that an amount of interference exerting an influence upon other cells may significantly vary depending on the data rate of the MS, so that serious channel variation of the MSs located in other cells may occur, deteriorating the system. In addition, the limited rate transition scheme has a disadvantage in that the BTS must determine the data rate of the MS within a limited range. In contrast, the limited rate transition scheme may allow the BTS to transmit the scheduling result to the MS by using one bit, so an overhead thereof will be reduced. In addition, the limited rate transition scheme limits the transition range of the data rate of the MS within one step, so variation of the interference exerting an influence upon other cells is relatively reduced.

The BTS may set a maximum autonomous rate and a possibility of the maximum autonomous rate with respect to a specific service for the MS in order to reduce delay generated during the data rate control procedure. That is, if service data which can be autonomously transmitted are generated, the MS can transmit the data by selecting a predetermined data rate within a range of the maximum autonomous rate allocated thereto, so it is possible to minimize the delay. However, it is difficult to predict a point of time for the service data which can be autonomously transmitted. For this reason, the BTS must reserve resources corresponding to a sum of the autonomous data rates allocated to the MSs.

In the meantime, besides the above system in which the BTS controls the data rate of the MS, a system including a BTS capable of controlling a TPR" of an MS can be provided.

In the conventional mobile communication system, a reverse data transmission of the MS is power-controlled by means of the BTS. According to the power-control procedure for the MS, the MS receives a power control command from the BTS so as to directly control power of a pilot channel thereof, while controlling channels other than the pilot channel with a fixing value of the TPR. For example, if the TPR is 3 dB, a ratio of power of the traffic channel transmitted from the MS to power of the pilot channel is 2:1. Accordingly, when the MS determines a power gain of the traffic channel, the MS sets power of the traffic channel as a double of power of the pilot channel. Such a procedure is also available for other channels. That is, a gain of a corresponding channel is set with a fixed value in relation to a gain of the pilot channel. In a system in which the BTS controls the TPR instead of controlling the data rate of the MS, the BTS schedules the reverse transmission of various MSs while directly notifying the MSs of the scheduling result through the data rate so as to control the MSs. That is, the BTS notifies each MS of the TPR allocated thereto. The TPR may increase as the data rate increases. For instance, since an increase of the data rate by two causes the power allocated by an MS to the traffic channel to double, this increase of the data rate also indicates that the TPR is doubled. In the conventional mobile communication system, the data rate of a reverse traffic channel in relation to the TPR is preset in a table so that the BTS and the MS may recognize the relationship between the data rate of the reverse traffic channel and the TPR. Thus, a control for the data rate of the MS is substantially identical to a control for the TPR of the MS. In the following description, only a procedure of controlling the data rate of the MS by means of the BTS will be described for the purpose of convenience of explanation. However, as mentioned above, it is noted that a control scheme of the present invention is also applicable when the BTS controls the TPR instated of controlling the data rate of the MS.

A conventional MS used for autonomous transmission can transmit reverse data with various data rates within the TPR allocated with a maximum autonomous rate. The BTS transmits a grant message (hereinafter, referred to as "Grant" i.e., a control of reverse rate) to the MS in order to allow the MS to transmit the data with a predetermined data rate lower than the maximum autonomous rate, thereby limiting the maximum autonomous rate of the MS. According to the prior art, upon receiving the Grant from the BTS, the MS transmits data with the predetermined data rate at a point of data transmission time corresponding to the Grant, while transmitting next data using resources corresponding to the maximum autonomous rate. In addition, since the maximum autonomous rate can be changed only through a signaling message, a relatively long time corresponding to hundreds of microseconds is necessary in order to allocate a new maximum autonomous rate.

Under an actual reverse data transmission environment, the BTS may sufficiently allocate the maximum autonomous rate to a plurality of MSs. In this state, if service data having a higher priority are newly generated, the sum of the maximum autonomous rates is so large that resources to be allocated to the new service data may be insufficient. In this case, the maximum autonomous rate of each MS must be lowered in order to allocate the resources for the new service data. Current technologies require a long time for adjusting the maximum autonomous rate, so an additional transmission delay may occur when allocating the resources for the new service data, thereby degrading quality of the service. In addition, when limiting the maximum reverse autonomous rate by using the Grant, the Grant must be continuously transmitted to the MSs while the service having the higher priority is being transmitted. Thus, grant channels become complicated and the Grant cannot be transmitted to MSs receiving the same channels. In order to solve the above problem, a higher autonomous rate can be allocated for the service having the higher priority or users. In this case, however, the resources used for the reverse data transmission may be wasted during an interval in which the service data are not generated.

Figure 1A:
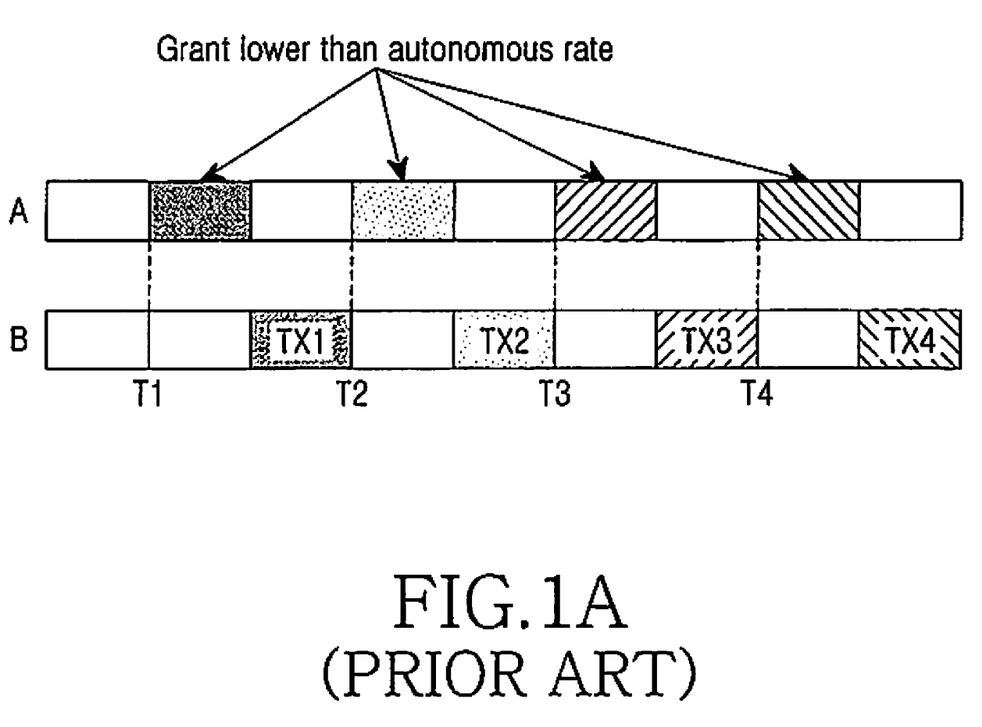
FIG. 1A is a diagram illustrating a conventional data transmission procedure of an MS based on reverse rate control information.

FIG. 1A is a diagram illustrating a conventional method of controlling a reverse rate, wherein "A" is a forward control channel for transmitting the Grant from the BTS and "B" is a reverse packet data channel for transmitting data to the BTS. The Grant is information related to the data rate lower than the maximum reverse autonomous rate. When the BTS transmits the Grant to the MS at a point of T1 so as to limit the maximum autonomous rate, the MS determines the Grant as a temporal limitation signal for the data rate, so the MS allocates the data rate corresponding to the Grant only at a point of T2, which is a first transmission time for data. That is, the data rate lower than the maximum autonomous rate is allocated based on the Grant only at a first slot receiving the Grant. In this case, if the new service or the MS having a higher priority continuously requires the resources, the Grant must be continuously transmitted so as to limit the autonomous rate. That is, the BTS transmits the Grant to the MS in each point of transmission time (T1 to T4) in order to limit the autonomous rate. Accordingly, the grant channels become complicated, thereby causing a forward overhead. For this reason, it is difficult to easily control the reverse rate.

SUMMARY OF THE INVENTION

Accordingly, the present invention has been made to solve the above-mentioned problems occurring in the prior art, and an object of the present invention is to provide an apparatus and a method for limiting reverse autonomous rates of MSs within a short period of time in order to improve the efficiency of using resources for reverse data.

Another object of the present invention is to provide an apparatus and a method for allocating sufficient resources to new services or users having a higher priority for services by fast limiting a maximum data rate of MSs, to which an autonomous transmission control is granted, when the users request services or new services are generated in a mobile communication system including a BTS and the MSs.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, preferred embodiments of the present invention will be described with reference to the accompanying drawings. In the following description, a detailed description of known functions and configurations incorporated herein will be omitted when it may make the subject matter of the present invention unclear.

The present invention is directed to apparatus and a method for allocating sufficient resources to new services or users having a higher priority for services by fast limiting a maximum data rate of one or more MSs, to which an autonomous transmission control is granted, when the users request services, or new services are generated in a mobile communication system including a BTS and the MSs.

The term "Persistence" is used herein to denote Grant Persistence. In contrast with the conventional method, the method of the present invention can persistently limit an autonomous rate of the MS by allowing the BTS to transmit the Grant including Persistence bits of data having a data rate lower than the autonomous rate.

Figure 1B:
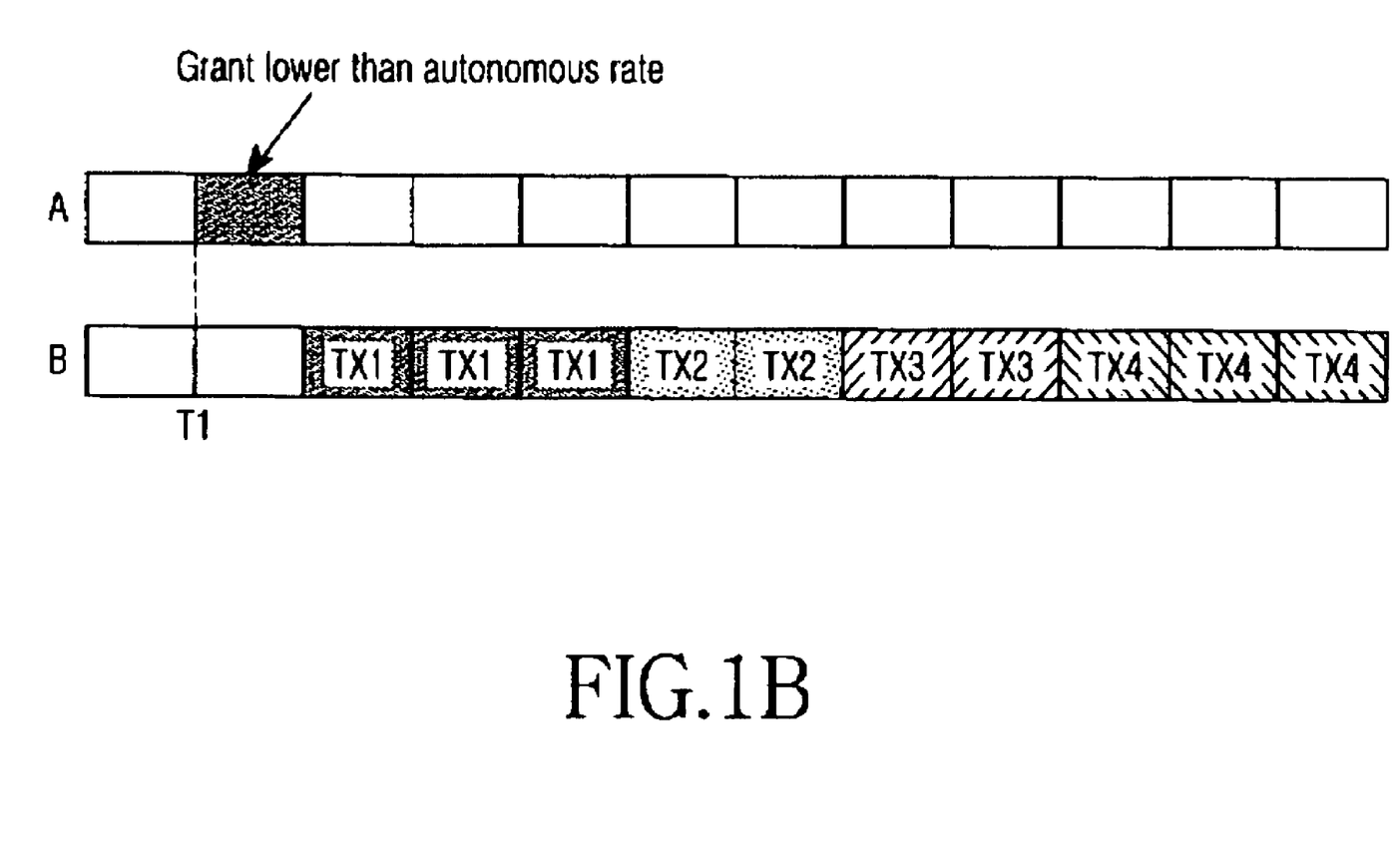
FIG. 1B is a diagram illustrating a data transmission procedure of an MS based on reverse rate control information according to one embodiment of the present invention.

FIG. 1B is a diagram illustrating a method of controlling a reverse rate according to one embodiment of the present invention. The BTS transmits the Grant and Persistence bits to the MS at a point of T1, so that the MS can select an autonomous rate within predetermined usable reverse resources based on the Grant if a new Grant is not received in the MS. Accordingly, in contrast to the control method shown in FIG. 1A, the control method shown in FIG. 1B does not require for continuously transmitting the Grant.

Figure 2:
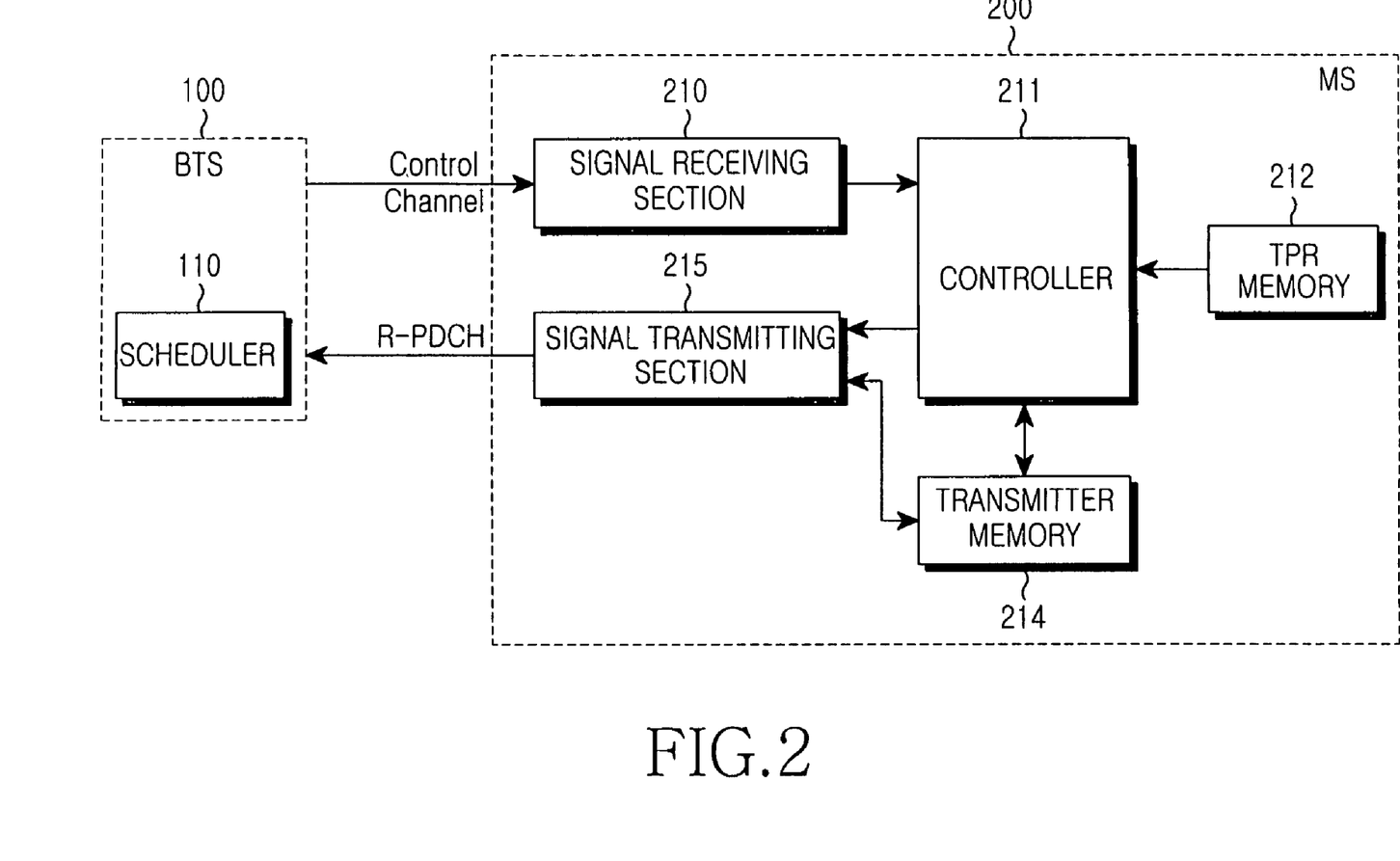
FIG. 2 is a block diagram illustrating a structure of a reverse rate control system according to the preferred embodiment of the present invention.

FIG. 2 is a block diagram a structure of a mobile communication system according to the preferred embodiment of the present invention.

A control channel for transmitting rate control information and an R-PDCH (reverse packet data channel) for transmitting reverse data are formed between the BTS 100 and the MS 200.

The BTS 100 includes a scheduler 110 so as to allocate the reverse packet data channel through the control channel and to create and transmit a message indicating a data rate and Persistence of data. The scheduler 110 performs the scheduling based on buffer sizes transmitted thereto from MSs and quantity of data and channel state information transmitted to the BTS from the MSs, thereby setting the Grant to be transmitted to the MSs. That is, the scheduler 110 performs a calculation through a predetermined algorithm by using the buffer sizes of the MSs, quantity of data and channel state information, thereby obtaining a priority order between the MSs in order to allow the MSs to transmit data according to the priority order thereof.

Herein, an autonomous rate control is granted to the MS 200 and the scheduler 110 checks a reverse load if new services requiring a great amount of resources are generated, and determines whether limitation for the reverse autonomous rate is required. In addition, the scheduler 110 transmits the Grant for the data rate lower than the maximum autonomous rate to the MS 200 according to the result of the above determination. At this time, the scheduler 110 transmits Persistence bits for the Grant together with the Grant.

A signal receiving section 210 of the MS 200 receives information of a control channel from the BTS 100, converts the control channel information into a signal, which can be processed by means of a controller 211, and outputs the converted signal. According to the present invention, the signal receiving section 210 receives the Grant for limiting the autonomous rate transmitted from the BTS 100, Persistence bit and an RCB (rate control bit). The Grant includes an authorized TPR information for the MS 200. From the Grant information, a receiver 210 or the MS 200 can determine or select an authorized TPR. The receiving section 210 transmits the received information to the controller 211. Thus, the controller 211 stores the Grant, the persistence bit and the RCB in a TPR memory 212. The TPR memory 212 includes an area for storing at least one value of a TPR table, and an area for storing information related to the Grant, the Persistence bit, and the RCB.

A transmitter memory 214 can store at least two different service data therein. The transmitter memory 214 outputs data and information related to quantity of the data stored in its memory to the controller 211. In addition, the transmitter memory 214 outputs quantity of data forming coded packets to a signal transmitting section 215 according to control information of the coded packets outputted from the controller 211. The signal transmitting section 215 codes the data transmitted thereto from the transmitter memory 214 based on the control signal, which is transmitted to the signal transmitting section 215 from the controller 211, and selects the coded data having a size corresponding to the control signal. The selected data are transmitted to the BTS through a reverse packet data channel with a data rate and transmission power determined by the controller 211.

Hereinafter, an operation of the controller 211 will be described in detail. The controller 211 receives the Grant including the Persistence bit. At this time, if the Grant including the Persistence bit represents the data rate lower than a predetermined maximum autonomous rate, the data rate is determined as a maximum reverse usable resource (maximum rate) of the MS, so that a data rate identical to or lower than the maximum reverse usable resource is selected. In addition, if the controller 211 receives the RCB after receiving the Grant including the Persistence bit, the controller does not vary the maximum reverse usable resource (authorized TPR) based on the RCB, and then, the controller 211 disregards the RCB. However, if the controller 211 receives a new Grant, which is a new limitation command granting a data rate lower than the reverse autonomous rate, the reverse usable resource is reset based on the new Grant. If the new Grant indicates that it is necessary to allocate a great amount of resources exceeding the reverse autonomous rate, the controller 211 resets the maximum reverse usable resource by taking the amount of resources into consideration and the maximum reverse autonomous rate is set to the above-mentioned data rate limited by the Grant.

According to another embodiment of the present invention, even if the MS receives the Grant including the Persistence bit (=1) granting the data rate lower than the predetermined maximum reverse autonomous rate, the maximum reverse usable resource (authorized TPR) can be changed based on the RCB transmitted to the MS from the BTS so as to increase or decrease the data rate of the MS.

Hereinafter, a method of controlling the reverse rate in the mobile communication system having the above structure will be described in detail with reference to FIGS. 3 through 6.

Figure 3:
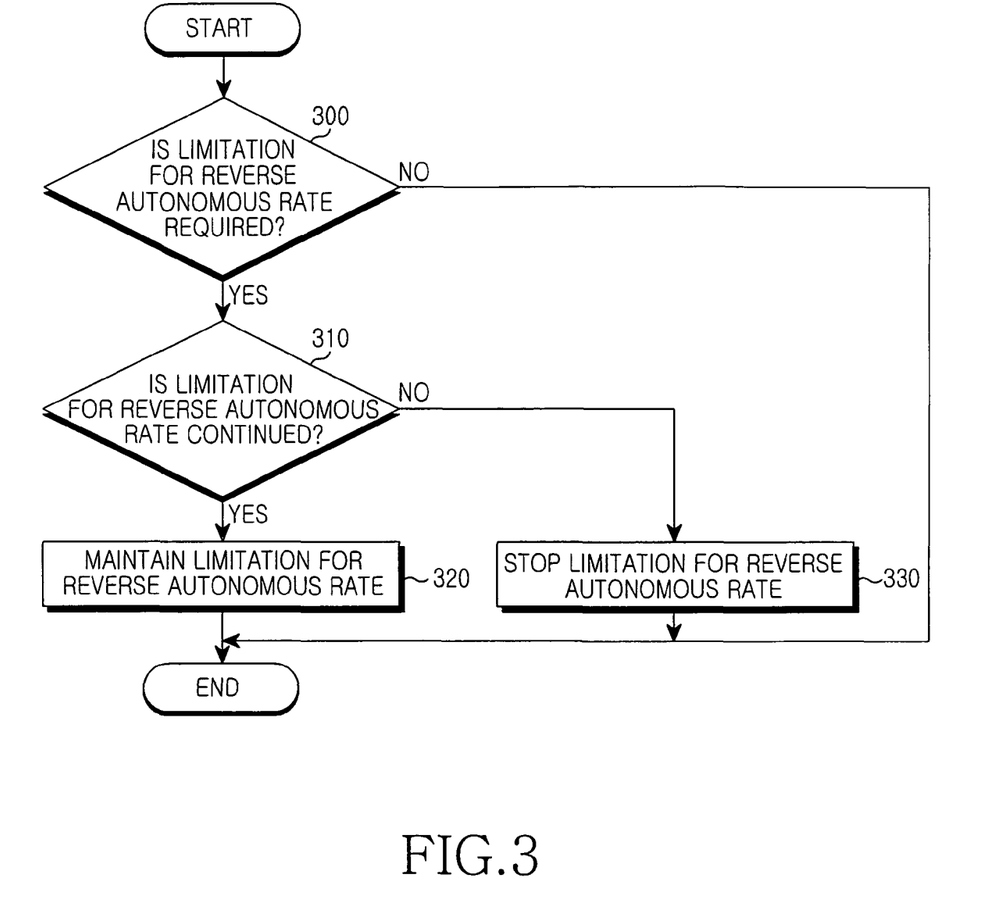
FIG. 3 is a flowchart illustrating an operation of a BTS performing a method of controlling a reverse rate according to the preferred embodiment of the present invention.

FIG. 3 is a flowchart illustrating a method of controlling the reverse rate in the BTS according to the preferred embodiment of the present invention. In FIG. 3, it is assumed that MSs, to which the reverse autonomous rate control is granted, are located in a service area of the BTS.

The BTS checks a reverse load during the scheduling when new services are generated or when it is necessary to check the reverse load, thereby determining whether the reverse autonomous rate must be limited (step 300). If it is determined in step 300 that the reverse autonomous rate must be limited, the BTS checks whether the limitation for the reverse autonomous rate must be continued (step 310). If it is determined in step 310 that the limitation for the reverse autonomous rate must be continued, the BTS creates Persistence bit (=1) for limiting the reverse rate and transmits the Persistence bit to the MS through the control channel. However, it is determined in step 310 that the limitation for the reverse autonomous rate is not necessary, the BTS creates a Grant for temporarily limiting the reverse rate and a Persistence bit (=0) for stopping the limitation for the reverse autonomous rate, and sends the Grant and the Persistence bit (=0) to the MS.

Figure 4:
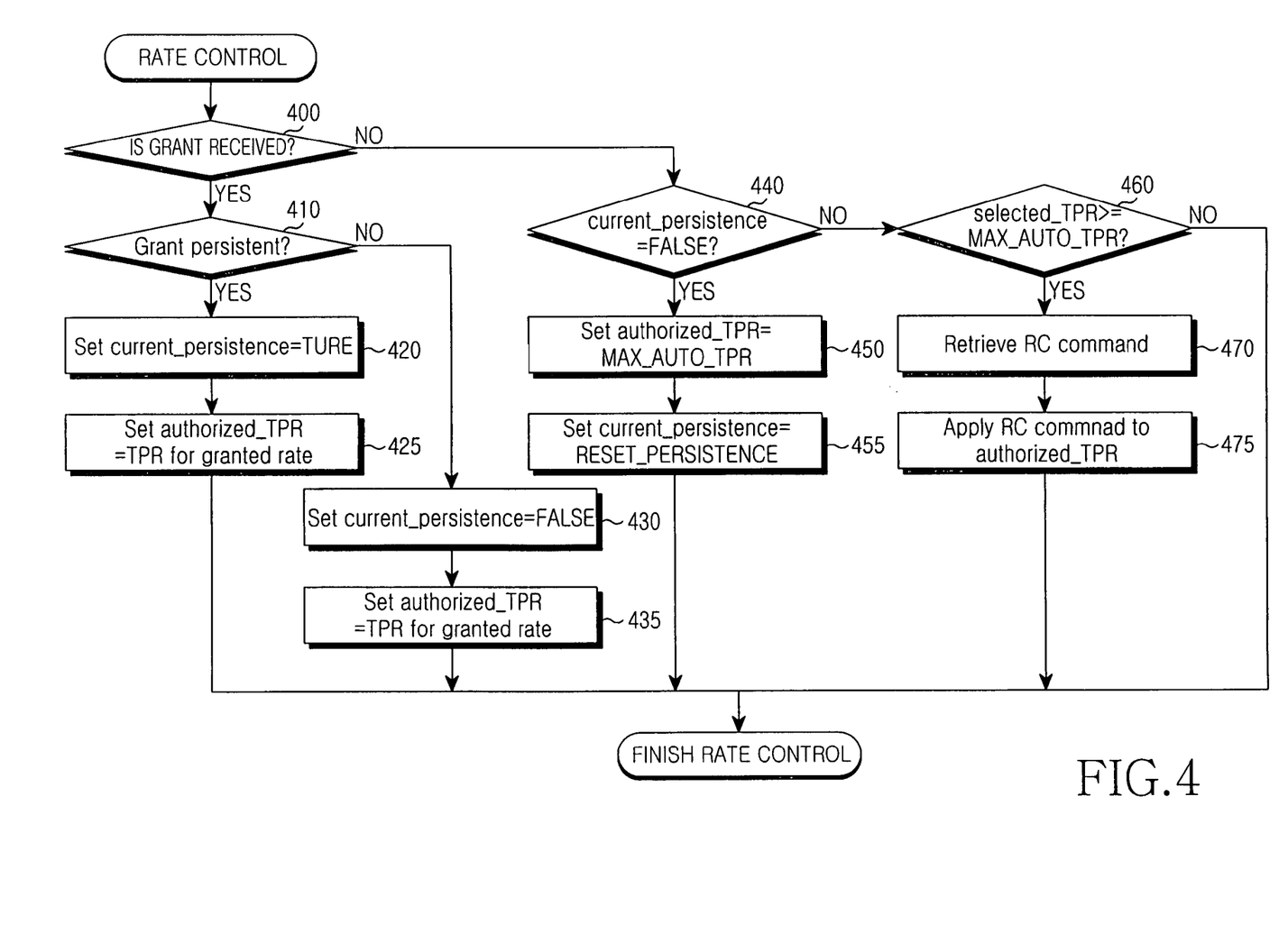
FIG. 4 is a flowchart illustrating an operation of an MS performing a method of controlling a reverse rate according to the preferred embodiment of the present invention.

FIG. 4 is a flowchart illustrating a method of controlling the reverse rate in the MS according to the preferred embodiment of the present invention.

The MS checks whether the Grant of the BTS is received therein (step 400). If it is determined in step 400 that the Grant is received in the MS, the MS checks the Persistence bit included in the Grant (step 410). That is, the MS checks whether the Persistence bit is set to a 1 or to a 0 in step 410. If it is determined in step 410 that the Persistence bit is equal to "1" representing a Grant Persistence, the controller 211 sets a current Persistence to "TRUE" (step 420), and resets quantity of the reverse usable resources (authorized TPR) based on the Grant (step 425). However, if it is determined in step 410 that the Persistence bit is equal to "0", the controller 211 sets the current Persistence to "FALSE" (step 430) and sets the authorized TPR as a TPR for a granted rate (step 435).

In the meantime, if it is determined in step 400 that the Grant is not received in the MS, the MS checks the current Persistence (step 440). If the current Persistence is set to "FALSE", the MS sets the authorized TPR to a maximum reverse autonomous rate (step 450). In addition, when a call connection is realized between the MS and the BTS, the MS sets the current Persistence to RESET_PERSISTENCE (step 455), which is determined when the Persistence is continuously maintained in the "FALSE" state. However, if it is determined in step 440 that the Persistence is set with respect to the MS which does not receive the Grant, the MS checks whether quantity of the resources, which has been recently used for reverse transmission, is larger than the maximum autonomous rate (step 460). If it is determined in step 460 that the quantity of the resources is larger than the maximum autonomous rate, the MS determines that it receives the RCB (step 470), so the MS applies the RCB to the current authorized TPR (step 475).

In order to limit the autonomous rate of the MS, the BTS may transmit the Persistence bit (=1) granting the data rate lower than the maximum autonomous rate together with the Grant. Upon receiving the Persistence bit (=1) and the Grant, the MS applies the RCB in steps 470 and 475 only when a condition of step 460 is satisfied. However, since the MS sets the authorized TPR lower than the maximum autonomous rate at a point of receiving the Persistence bit (=1) and the Grant in steps 420 and 425, the MS selects the data rate lower than the maximum autonomous rate when transmitting data. In this case, the condition of step 460 is not satisfied so that the MS does not apply the RCB. Therefore, the MS receiving the Persistence bit (=1) and the Grant for limiting the autonomous rate maintains quantity of usable resources (authorized TPR) in a limited level before the MS receives the next Grant.

According to another embodiment of the present invention, even if the MS receives the Grant including the Persistence bit (=1) for granting the data rate lower than the predetermined maximum reverse autonomous rate, the maximum reverse usable resource (authorized TPR) can be changed based on the RCB transmitted to the MS from the BTS so as to increase or decrease the data rate of the MS.

In order to temporarily limit the autonomous rate of the MS, the BTS can transmit the Grant, which grants the data rate lower than the maximum autonomous rate of the MS. Upon receiving the Grant, the MS resets the authorized TPR to the maximum autonomous TPR through steps 440 and 450 based on the RCB. Then, the next steps are normally carried out without limiting the maximum autonomous rate.

The MS transmitting data in a reverse direction must continuously check the forward control channels, such as an F-ACKCH (forward acknowledge channel), an F-GCH (forward grant channel) and an F-RCCH (forward rate control channel).

Figure 5:
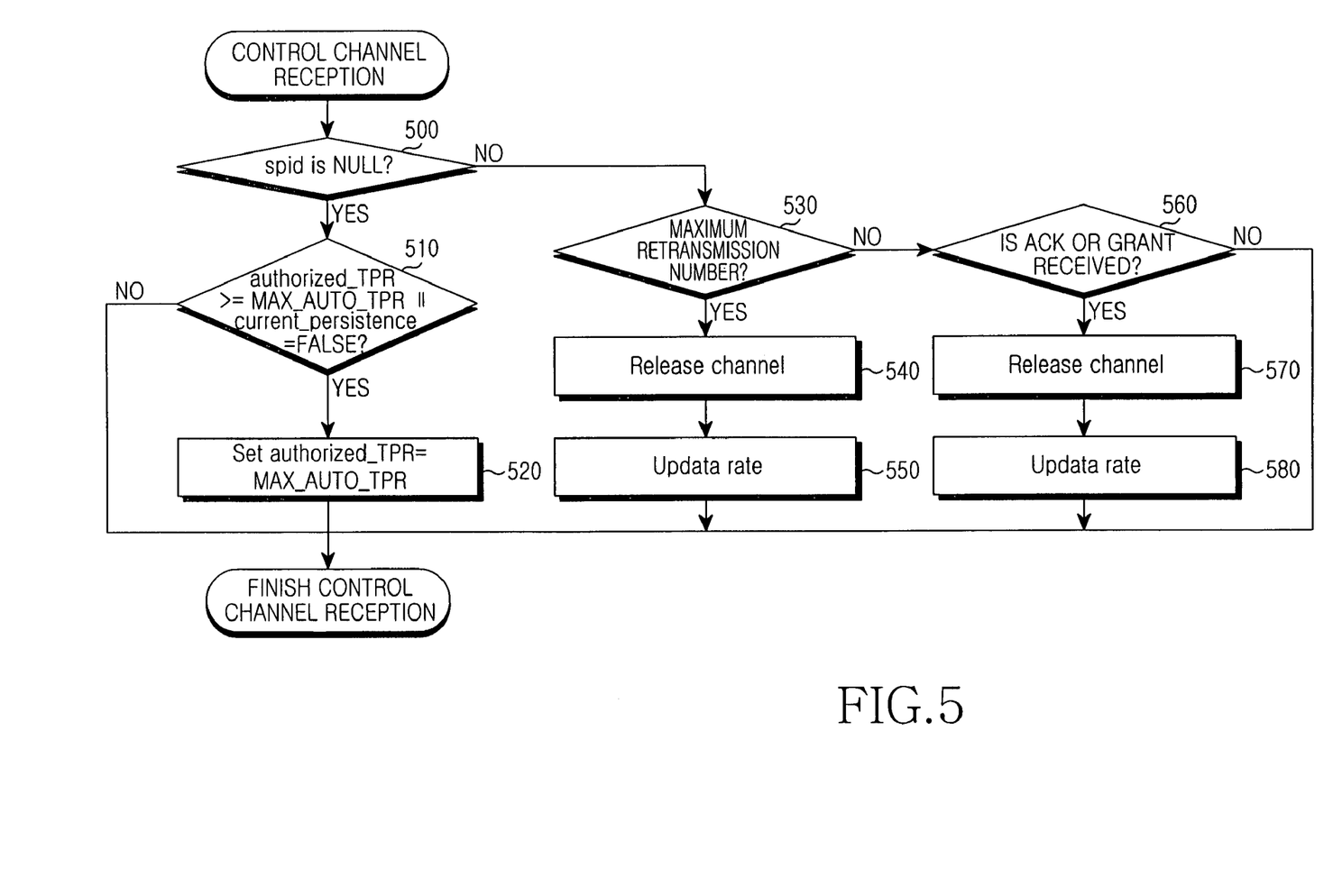
FIG. 5 is a flowchart illustrating an operation of an MS receiving a forward control channel.

FIG. 5 is a flowchart illustrating an operation of the MS receiving such forward control channels. The MS checks data being currently transmitted (step 500). If it is determined in step 500 that the MS has no data to be transmitted or there are no data being currently transmitted, the MS checks whether the authorized TPR is larger than the maximum autonomous TPR, or whether the authorized TPR is lower than the maximum autonomous TPR with a "FALSE" state of the current Persistence (step 510). If it is determined in step 510 that the authorized TPR is larger than the maximum autonomous TPR, or the "FALSE" state of the current Persistence, the MS determines that resources for the MS are no more required, so the MS sets the authorized TPR to the maximum autonomous TPR (step 520). That is, the MS receiving the Grant Persistence and the Grant for controlling the autonomous rate maintains the limited resources without resetting a value of the authorized TPR to a value corresponding to the autonomous rate due to the Grant Persistence when the authorized TPR has been set to a value lower than the maximum autonomous rate. However, the MS receiving the Grant with the "FALSE" state of the current Persistence for controlling the autonomous rate resets the authorized TPR to a value corresponding to the maximum autonomous rate. Then, the next steps are normally carried out without limiting the autonomous rate.

If it is determined in step 500 that there are data being currently transmitted, the MS checks whether the number of transmission times reaches a maximum retransmission number (step 530). In addition, if it is determined in step 530 that the number of transmission times reaches the maximum retransmission number, the MS releases the reverse channel (step 540), and performs a procedure for controlling the data rate identical to the rate control procedure described with reference to FIG. 4 (step 550).

In the meantime, if it is determined in step 530 that the number of transmission times does not reach the maximum retransmission number, the MS checks whether ACK or the Grant is received therein (step 560). If the MS receives the ACK or the Grant therein in step 560, the MS determines that current data are properly transmitted to the BTS, so the MS releases the reverse channel (step 570). In addition, the MS performs a procedure for controlling the data rate identical to the rate control procedure described with reference FIG. 4 (step 580).

The MS having data to be transmitted in a reverse direction determines an actually available data rate within a range of the reverse usable resources which are currently allocated to the MS. Quantity of the usable resources according to the data rate is preset in the TPR table. The BTS and the MS may use at least one TPR table depending on the sort of various services.

Figure 6:
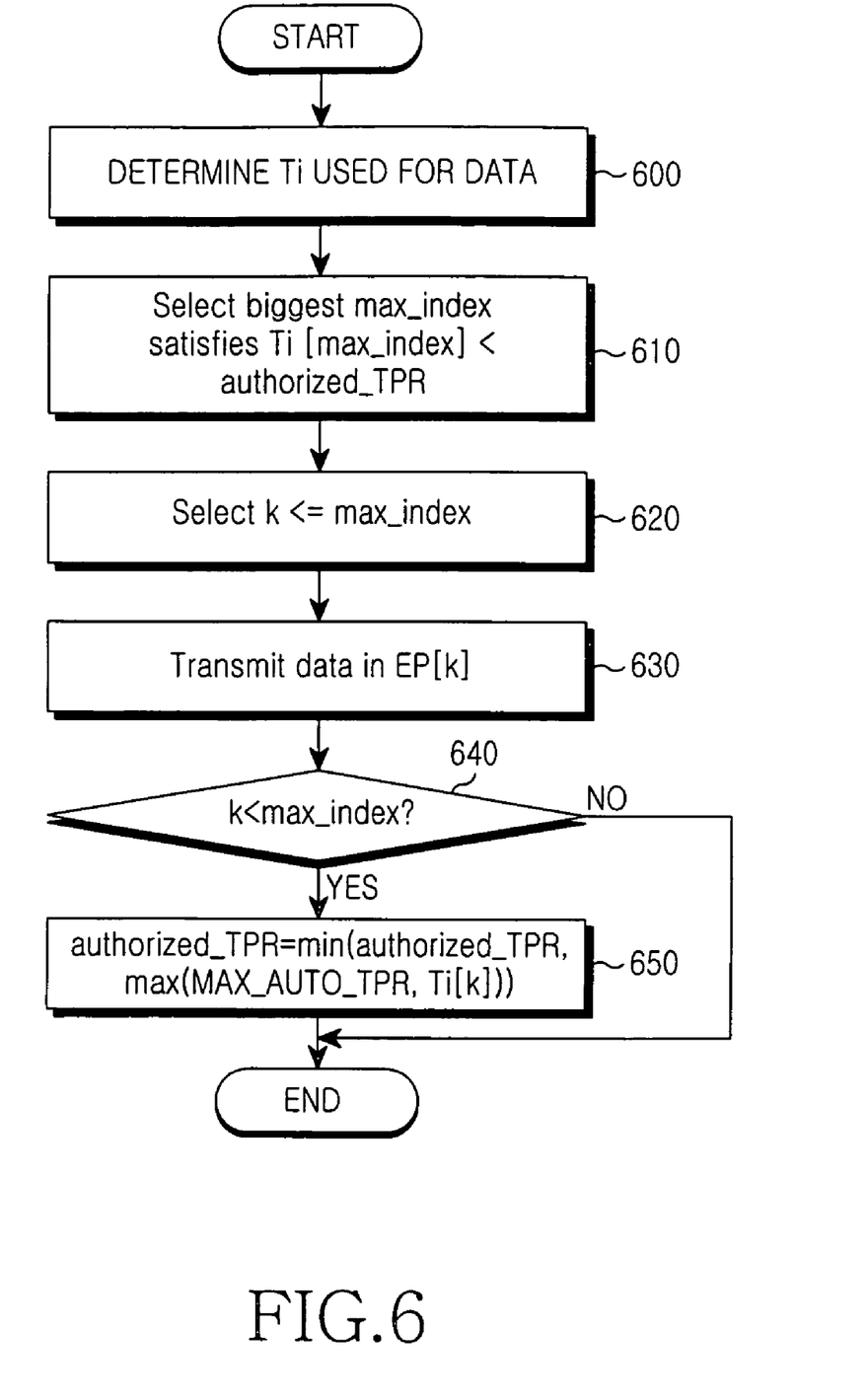
FIG. 6 is a flowchart illustrating a procedure for transmitting reverse data in an MS.

FIG. 6 is a flowchart illustrating a procedure for transmitting reverse data in the MS. Referring to FIG. 6, as data to be transmitted are generated, the MS determines Ti of the TPR table used for transmitting the data (step 600). In addition, the MS selects a max_index, which is a maximum data rate used for the authorized TPR (authorized_TPR) (step 610). The max index is computed such that the TPR is less than or equal to the authorized TPR corresponding to the information received from the base station. The MS selects a rate according to resources (Ti[k]) used for the actual transmission and an index (k) corresponding to a size of an encoder packet (EP) (step 620). The index is selected such that the TPR is less than or equal to the authorized TPR corresponding to the information received from the base station. And thereby transmitting data with the corresponding data rate and EP size (step 630). After transmitting data, the MS must update the authorized_TPR. Thus, the MS checks whether the actual data rate and the EP size are less than the data rate corresponding to the max_index (step 640). If it is determined in step 640 that the actual data rate and the EP size are less than the data rate corresponding to the max_index, the MS selects a larger one from the TPR corresponding to the EP and the maximum autonomous rate and resets the authorized_TPR to a smaller one selected from the larger one and the authorized TPR. However, if the actual data rate and the EP size are not less than the data rate corresponding to the max_index, the current authorized_TPR is maintained.

According to another embodiment of the present invention, if a lower authorized_TPR is required by the BTS, the MS resets the authorized_TPR by selecting a minimum value from a value of the resources (Ti[k]) corresponding to the EP, a value of MAX_AUTO_TPR according to the maximum autonomous rate, and a value of the authorized_TPR in step 650.

Upon receiving the Grant for limiting the maximum reverse autonomous rate and the Grant Persistence bit, the MS sets the authorized_TPR to a value less than a value of the reverse autonomous rate. Therefore, it is possible to constantly set the authorized_TPR in step 650, so the maximum autonomous rate may be limited if the authorized_TPR is not reset by the new Grant.

As described above, the present invention can allocate sufficient resources to new services or users having a higher priority for services by fast limiting the maximum data rate of MSs, to which an autonomous transmission control is granted, without complicating grant channels and causing the forward overhead when the users request services or new services are generated in a mobile communication system including the BTS and the MSs.

While the invention has been shown and described with reference to certain preferred embodiments thereof, it will be understood by those skilled in the art that various changes in form and detail may be made therein without departing from the spirit and scope of the invention as defined by the appended claims.

What is claimed is:

1. A method of setting an authorized traffic-to-pilot ratio (TPR) of a mobile station (MS) capable of autonomously transmitting a packet data, the method comprising the steps of:
    receiving an information corresponding to an authorized TPR from a base station (BS);
    selecting a TPR less than or equal to the authorized TPR;
    determining a maximum one of a maximum autonomous TPR and the selected TPR; and
    setting the authorized TPR to a minimum one of the authorized TPR and the maximum one.

2. The method as claimed in claim 1, further comprising a step of determining a TPR table used for transmitting data.

3. The method as claimed in claim 1, further comprising a step of computing a max index such that the TPR is less than or equal to the authorized TPR corresponding to the information received from the BS.

4. The method as claimed in claim 3, further comprising a step of selecting an index such that the TPR is less than or equal to the authorized TPR corresponding to the information received from the BS.

5. The method as claimed in claim 4, wherein the determining step and setting step comprise if the index used for transmitting data is less than the max index.

6. The method as claimed in claim 4, wherein data is transmitted in a packet size corresponding to the index used in actual transmission of data.

7. The method as claimed in claim 1, wherein the authorized TPR corresponding to the information received from the BS is less than or equal to the maximum autonomous TPR (MAX_AUTO_TPR) of the MS.

8. The method as claimed in claim 1, wherein a reverse packet data are transmitted through a reverse packet data channel with the selected TPR.

9. The method as claimed in claim 1, wherein the maximum autonomous TPR (MAX_AUTO_TPR) of the MS is changed through a signaling.

10. The method as claimed in claim 1, wherein the authorized TPR is changed according to a rate control information transmitted to the MS from the BS.

11. An apparatus for setting an authorized traffic-to-pilot ratio (TPR) of a mobile station (MS) capable of autonomously transmitting a packet data, the apparatus comprising:
    a receiver adapted to receive an information corresponding to an authorized TPR from a base station (BS); and a controller adapted to select a TPR less than or equal to the authorized TPR and determine a maximum one of a maximum autonomous TPR and the selected TPR and set the authorized TPR. to a minimum one of the authorized TPR and the maximum one.

12. The apparatus as claimed in claim 11, further comprising a TPR memory for storing a TPR table used for transmitting data.

13. The apparatus as claimed in claim 11, wherein the controller computes a max index such that the TPR is less than or equal to the authorized TPR corresponding to the information received from the BS.

14. The apparatus as claimed in claim 13, wherein the controller selects an index such that the TPR is less than or equal to the authorized TPR corresponding to the information received from the BS.

15. The apparatus as claimed in claim 14, wherein the controller sets the authorized TPR if the index is less than the max index.

16. The apparatus as claimed in claim 11, wherein the MS further comprises a transmitter adapted to transmit a data corresponding to the index used in transmission of data.

17. The apparatus as claimed in claim 11, wherein the authorized TPR corresponding to the information received from the BS is less than or equal to the maximum autonomous TPR (MAX_AUTO_TPR) of the MS.

18. The apparatus as claimed in claim 11, wherein the receiver receives the maximum autonomous TPR (MAX_AUTO_TPR) through a signaling.

19. The apparatus as claimed in claim 11, wherein the controller changes the authorized TPR according to a rate control command transmitted to the MS from the BS.

* * * * *